United States Patent [19]

Burris et al.

[11] 3,927,511

[45] Dec. 23, 1975

[54] METHOD AND APPARATUS FOR HARVESTING COTTON

[76] Inventors: James D. Burris, P.O. Box 72;
Bobby V. Burris, P.O. Box 164,
both of Muleshoe, Tex.

[22] Filed: Oct. 23, 1973

[21] Appl. No.: 408,411

[52] U.S. Cl. .................................................. 56/33
[51] Int. Cl.² ........................................ A01D 46/12
[58] Field of Search ............ 56/33, 34, 35, 126–130, 56/14.3–14.6, 13.3; 130/27 R, 27 H, 27 HF, 27 HA, 27 J, 27 K, 27 L

[56] References Cited
UNITED STATES PATENTS

| | | | |
|---|---|---|---|
| 242,301 | 5/1881 | Goodwin | 56/34 |
| 1,638,867 | 8/1927 | Melton | 56/35 |
| 1,750,439 | 3/1930 | Streun | 56/34 X |
| 1,847,530 | 3/1932 | Heyden | 130/27 R X |
| 1,990,816 | 2/1935 | Conrad | 56/34 X |
| 2,507,669 | 5/1950 | Heth | 56/13.3 |
| 2,517,063 | 8/1950 | Wallace | 56/34 |
| 2,664,687 | 1/1954 | Brown | 56/35 |
| 3,543,487 | 12/1970 | Bodine | 56/14.6 |
| 3,729,909 | 5/1973 | Gray et al. | 56/34 |

FOREIGN PATENTS OR APPLICATIONS

| | | | |
|---|---|---|---|
| 23,058 | 4/1918 | Denmark | 130/27 HA |

Primary Examiner—Russell R. Kinsey
Attorney, Agent, or Firm—Burton, Crandell & Polumbus

[57] ABSTRACT

In accordance with the present invention, a conventional combine is modified for the harvesting of cotton by mounting a plurality of closely spaced cotton stripping fingers on the forward edge of the machine platform to strip cotton bolls from the stalks as the machine is advanced through the field. A reel mounted above the stripping fingers is employed to feed the stripped bolls rearwardly into the feeder house of the combine, and the stripped bolls are then fed into the cylinder-concave threshing unit of the machine. During its passage through the cylinder unit, the stems, leaves, and other trash material fed into the machine with the cotton are broken up or pulverized and drop through the openings in the concave unit, while the cotton fibers, together with a residual amount of trash are fed from the cylinder to the straw walker where a further separation of trash from the cotton fibers is accomplished. A transition bridge and shroud is mounted between the cylinder outlet and the inlet end of the straw walker to prevent material from falling between these two units, while a rotating kicker element is also located in this region to assist in feeding and further flailing the material to further break up any residual stems or other trash elements discharged from the cylinder with the cotton fibers.

7 Claims, 4 Drawing Figures

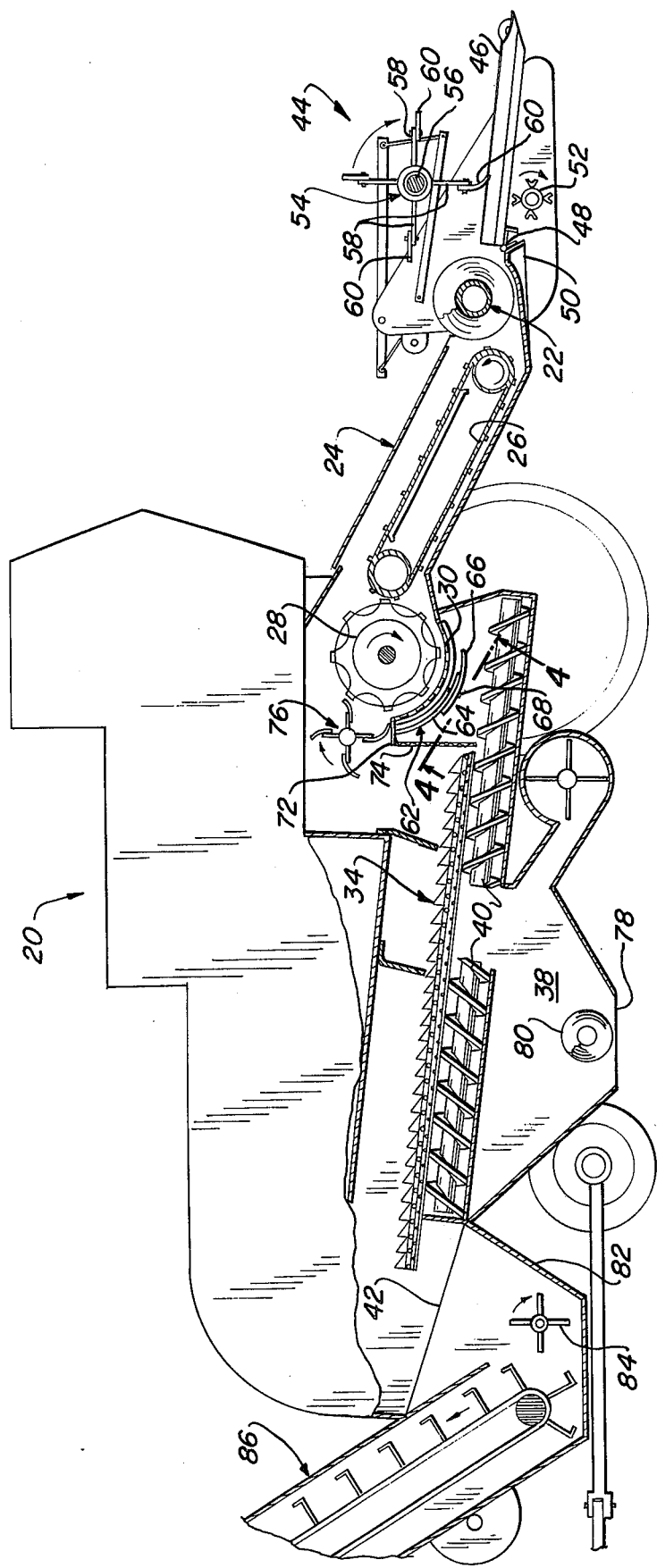

METHOD AND APPARATUS FOR HARVESTING COTTON

BACKGROUND OF THE INVENTION

Commercially available machines designed specifically for cotton harvesting, see for example U.S. Pat. No. 3,734,563, are specifically designed for the single purpose of harvesting cotton and at the present time may command a price of up to $15,000. In addition to the fact that these machines are specifically designed for and useful only in the harvesting of cotton, commercially available cotton harvesters perform only two basic functions — namely, that of stripping the boll from the plant and conveying the stripped bolls to a storage bin. In some cases, such as that of the machine shown in U.S. Pat. No. 3,734,563, the machine may perform a primary separating operation in separating green bolls from ripe bolls; however, little attention is paid to the further problem of separating from the cotton fibers stems, leaves, and other trash inherently collected by the machine during the stripping operation. Collection of trash together with the cotton fibers is usually justified on the basis that the cotton must in any event be processed through a cotton gin to separate the seeds from the fibers and the separating process performed in the gin will also remove the trash. However, this particular line of reasoning ignores two important points of direct economic interest to the farmer.

First, the cotton gin operator charges the farmer on the basis of the total weight of material fed into the gin, and the total weight upon which the charge is based thus includes the weight of whatever trash the farmer may have trucked to the gin along with his cotton. Second, the trash is useful as fertilizer and is frequently trucked back to the farm from the gin and spread back into the very field from which it was originally removed.

The present invention provides a method by which a substantial amount of the trash stripped from the cotton plant together with the boll may be separated from the cotton fibers and redistributed in the field during the harvesting operation. The present invention is also directed to structural modifications which, when applied to a conventional combine, enable this improved harvesting technique to be performed by a combine in a manner such that a given cotton crop can be harvested in less time and at less expense and with a reduced trash content as compared to the results of commercially available cotton harvesters specifically designed for this purpose.

SUMMARY OF THE INVENTION

Apart from the tractor, the combine is probably the most universally employed item of farm equipment encountered in those regions where substantial amounts of wheat, corn, soybeans and other grains are raised. As is implied from its name, the combine performs two basic harvesting operations — a cutting or first separating operation in which the produce bearing portion of a plant is separated from the rooted portion of a stalk, and a threshing or secondary separating operation in which the produce is further separated from the stem portion or other trash harvested by the machine during the cutting or first separation step. By equipping the combine with specialized harvesting heads and by appropriate adjustment to the threshing mechanism, the basic combine is readily adapted for use on a wide variety of crops the most common examples of which are wheat, soybeans, corn, and other crops in which the desired product is of a relatively dense granular nature and the trash or undesired material harvested consists of stems, straw, leaves, etc. Although cotton is grown in many regions, such as Texas and other areas of the Southwest, where corn, milo, wheat and other crops conventionally harvested by combines are also grown cotton has always been harvested heretofore in these regions by specialized cotton harvesters and to the best of applicants' knowledge, no one has previously attempted to adapt a conventional commercially available combine for use in a cotton harvesting operation.

In accordance with the present invention, a conventional combine may be readily adapted for use in harvesting cotton and in the concurrent performance of a preliminary separation of trash from the cotton fibers by handling the cotton fibers within the combine in the same manner as the trash is handled in the case of the usual combine harvested crops such as wheat, and by processing the trash in the cotton harvesting operation in the same manner as the grain is processed in the case of a wheat handling operation. Minor modifications to the combine are required to adapt it for a cotton harvesting operation; however, the modifications are of a relatively minor nature well within the capability of most farmers to install or remove.

In modifying a conventional combine for use in cotton harvesting, it is first necessary to install a cotton stripping head on the machine platform, just as it is necessary to install a cornhead on the combine when converting the combine from a wheat harvesting to a corn harvesting operation. The stripping head takes the form of a plurality of fairly closely spaced stripping fingers which project forwardly from the front of the machine to pass beneath the cotton bolls so that two fingers are operable to pluck the boll from the main stalk as the machine is advanced across a cotton field. In the present stripping arrangement, the fingers are mounted to extend across the entire front of the platform over a width of approximately 15 feet so that the machine is equally well adapted to the harvesting of row planted cotton or broadcast cotton or is capable of harvesting cross-wise of row planted cotton. A flail-like reel is mounted for rotation above the fingers to feed the stripped bolls rearwardly into the conventional feeder house of the combine. The stripped bolls pass rearwardly through the feeder house into the nip of the cylinder-concave threshing unit. During its passage through the cylinder-concave, the material is subjected to a rapid threshing action and trash, such as stem portions, leaves, etc. in the material tends to be broken up into relatively small granular particles and passes downwardly through the grid of the concave into the grain collecting portion of the combine. Material discharged from the rear of the cylinder-concave threshing unit passes over a sheet metal bridge which, in accordance with the present invention, is added to the combine at this point to prevent an undue amount of cotton fibers from falling downwardly between the cylinder outlet and straw walker inlet.

In addition, to the foregoing modifications, an adjustable shutter plate is mounted in underlying relationship to the concave grid to adjustably vary the effective inlet opening to the grain discharge system from the concave grid. A certain portion of cotton fibers will inevitably pass through the concave grid along with the cotton trash and adjustment of this shutter is used to control the amount of material diverted from the main flow path of material through the concave grid. With the shutter at a maximum open position, a higher percentage of trash will be separated from the cotton during passage through the cylinder-concave unit; however, a correspondingly higher percentage of cotton fibers will also pass with the trash through the concave grid. Closure of the shutter will reduce the amount of trash separated at the cylinder-concave unit; however, it will correspondingly reduce the loss of cotton fibers from the mainstream at this location. Where a relatively sparse cotton crop is being harvested, it may become economically practical to accept a higher trash load in the discharged cotton in order to assure collection of sufficient cotton. In the case where the crop is extremely lush, on the other hand, the shutter may well be positioned at a full open position because a minor loss of cotton fiber at the cylinder-concave unit is not as large a factor percentage-wise of the total amount of cotton passing through the unit and the cotton loss is economically outweighed by the increased trash separation provided at the opened shutter.

Further separation of the trash is accomplished during passage of the cotton fibers and residual trash along the straw walker of the combine, air being blown upwardly to float the cotton while permitting the denser trash particles to drop through the walker screens into the grain collection system of the combine.

The cotton fibers are discharged from the normal trash discharge opening of the combine and a hopper is mounted under this latter opening to collect the discharge cotton fibers. The fibers are fed from the hopper into a conventional elevator which then discharges the cotton fibers into a trailing wagon hitched to the rear of the combine.

In the cotton harvesting operation, the separated trash is handled by the grain collection system of the combine and is continuously discharged from the combine by removing appropriate floor plates from the grain handling system of the combine to allow the trash to fall back onto the ground as the unit moves through the field.

Other objects and features of the invention will become apparent by reference to the following specification and to the drawings.

IN THE DRAWINGS

FIG. 2 is a side elevational view of the combine of FIG. 1 with certain parts broken away or shown in section;

FIG. 3 is a top plan view of the inlet end portion of the straw walker taken from line 3—3 of FIG. 2;

FIG. 4 is a botton view of the adjustable shutter taken from line 4—4 of FIG. 2; and FIG. 5 is a detail side elevation of the adjustable shutter and shroud with certain parts broken away.

DETAILED DESCRIPTION OF THE DRAWINGS

Figure 1:
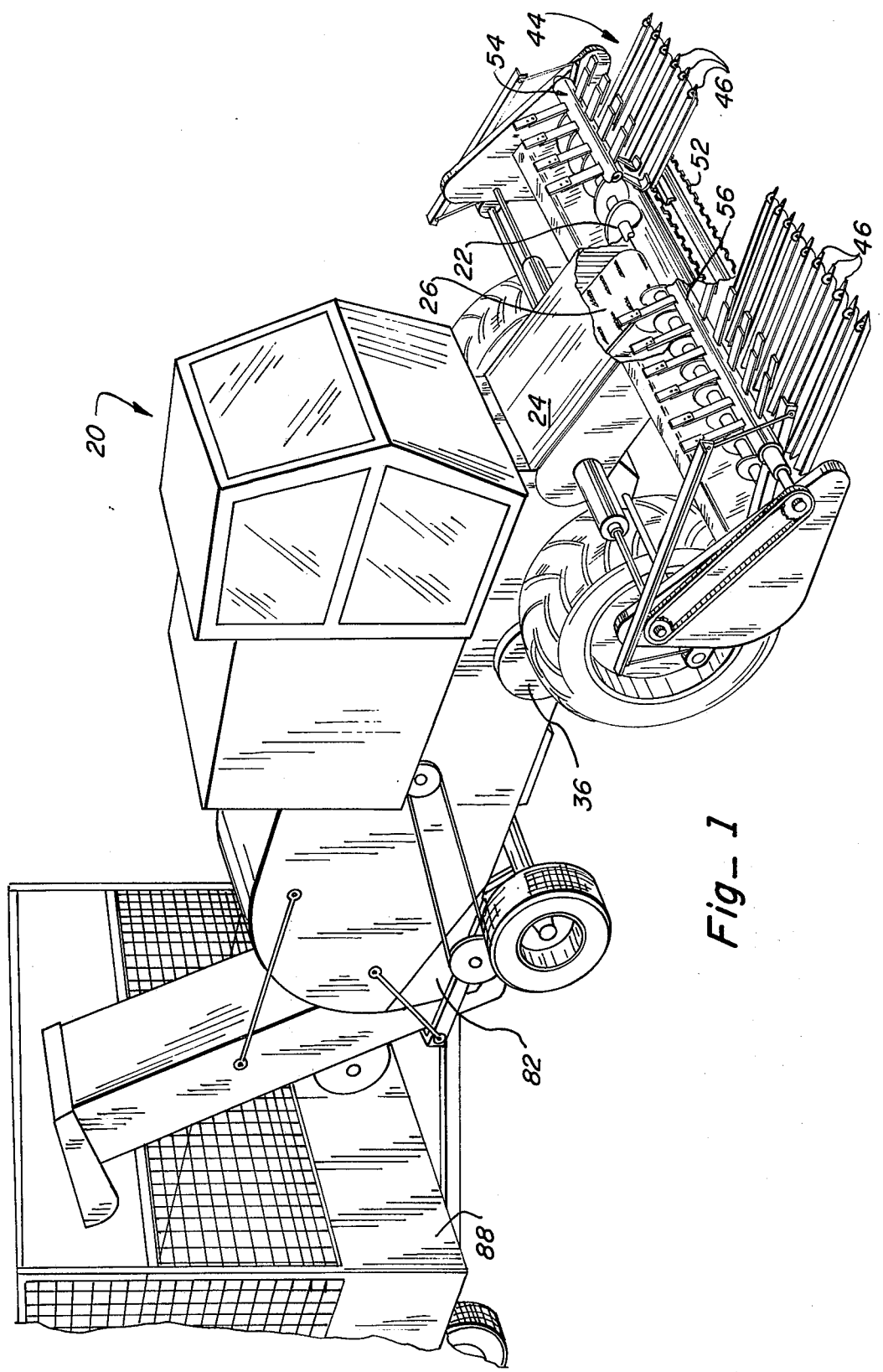
FIG. 1 is a perspective view of a combine adapted in accordance with the present invention for use in a cotton harvesting operation.

Referring to FIGS. 1 and 2, there are shown in these two figures overall views of a conventional combine adapted in accordance with the present invention for use in harvesting cotton. Certain details of the combine itself, not germane to the present invention, have been omitted; however, with the exception of the adaptions or modifications described in detail below, it may be assumed that the combine designated generally 20 is a combine of standard, commercially available construction. Referring briefly to FIG. 2, standard unmodified units of the conventional combine 20 include cross-feed augers 22 which feed material transversely to the inlet of a centrally located feeder house 24 having a conveyor 26. Conveyor 26 feeds material into the nip of the threshing unit which includes a cylinder 28 and a so-called concave 30 from which material passes to the lower end of a conventional straw walker 34. A blower 36 is located to direct a flow of air upwardly through straw walker 34, while a grain collecting system designated generally 38 and including conveying augers 40 extends in underlying relationship to concave 30 and straw walker 34. At the left hand end of the machine as viewed in FIG. 2, material is fed from straw walker 34 to a discharge opening 42.

The elements described above are driven in their normal manner from the motor (not shown) of combine 20 and since their construction, functions and mode of operations are well known, will not be described in further detail except as they directly relate to the present invention.

The combine of FIGS. 1 and 2 is shown as including a platform or stripping head designated generally 44 especially designed to strip cotton bolls from the stalks as the combine is driven through the field. Head 44 includes a plurality of stripping fingers 46 hingedly supported at their rearward ends as at 48 on platform 50. Fingers 46 are constructed of angle iron, tapered to a point at their forward end and transversely spaced relative to each other with an approximate 9/16 inch spacing. The fingers extend across the entire width of head 44, a group of fingers 46 near the center of the head having been omitted from FIG. 1 to show certain other details of the structure. The transverse width of head 44 on the specific machine shown in the drawings is approximately 14 feet; however, this width may vary in accordance with the size of combine and for larger combines may be as much as 22 feet. Fingers 46 function to strip cotton bolls from the plants by passing two fingers on opposite sides of a boll stem to pull the boll from the rooted plant as the machine advances through the field. This method of stripping normally results in breaking off with the fibrous boll itself a short section of stem and the leaf like brace at the juncture of the boll and stem.

To minimize the collection of stalks along with portions of the stem, a stalk roller 52 is mounted beneath fingers 46 adjacent the rearward ends of fingers 46 and is driven in rotation in a clockwise direction as viewed in FIG. 2 to drive the stalk of the plant downwardly and forwardly relative to the combine to prevent the fingers from pulling the stalk up by the roots.

A flail-like reel 54 is mounted upon head 44 above fingers 46 to drive stripped bolls collected on the tops of fingers 46 rearwardly onto platform 50 into cross-feed augers 22. Reel 54 includes a shaft 56 having a plurality of radially projecting arms 58 each having a relatively short length of flexible material 60 mounted at its outer end. As best seen in FIG. 2, the location of shaft 56 and the axial extent of arms 58 and flexible strips 60 is such that the strips brush over the tops of fingers 46 to flailingly sweep the cotton bolls rearwardly into augers 22. The stripped bolls are then cross-fed by augers 22 into operative relationship with conveyor 26 in feeder house 24 and are conveyed upwardly and rearwardly through the feeder house and discharged into the nip between cylinder 28 and concave grid 30.

Cylinder 28 and its cooperating concave unit 30 are of the well-known raspbar type in which material passing between cylinder 28 and concave 30 is not only driven through this path in a clockwise direction as viewed in FIG. 2 by the rotation of cylinder 28, but is also oscillated violently back and forth in an axial direction by inclined teeth arranged in alternately inclined rows on the cylinder. In the case of a wheat harvesting operation, this violent rasping motion separates the wheat grains from the straw and the separated grains drop through the spaces between the bars of concave 30 into the grain collection system while the straw remains above the bars of concave 30 and is discharged rearwardly onto straw walker 34.

When employed in a cotton harvesting operation in accordance with the present invention, cylinder 28 and concave 30 function in the same manner, exerting a violent rasping action, on the material passing through this unit. In the cotton harvesting operation, however, this rasping action is employed for the purpose of breaking up, crushing and attempting to separate the stems and other trash collected by the stripping head into relatively small articles so that these small particles may drop through the grid of concave 30 into the grain collection system of the combine. This rasping action is also exerted on the cotton fibers; however, because of their relatively lighter weight and stringy fibrous nature, the cotton fibers are more prone to be discharged from the cylinder-concave unit onto straw walker 34. A certain percentage of the fibers will inevitably pass through the grid of concave 30, and to minimize the loss of cotton fibers during this particular step of the operation, combine 20 is modified by mounting a sheet metal shutter assembly 62 in direct underlying relationship to the grid of concave 30 to reduce the area through which material can drop from concave 30 to the grain collection system. Where combine 20 is employed in a wheat harvesting operation, the threshing action exerted by cylinder 28 and concave 30 is relied upon as a primary wheat-straw separating step. When combine 20 is employed in accordance with the present invention in a cotton harvesting operation, the rasping action of cylinder 28 and concave 30 is relied upon primarily as a breaking up or pulverizing action upon the trash, combined with what may be best termed a minor separation of trash from cotton fiber.

The extent to which the effective opening through the bars of concave 30 is opened is preferably made adjustable by making shutter 62 of two relatively adjustable pieces of sheet metal 64, 66 having nut and bolt assemblies 68 passing through a hole in plate 64 and elongate slots 70 in plate 66 so that plate 66 can be adjustably clamped in selected positions of extension beyond the end of fixed plate 64. Because of variations in cotton crops, adjustment of the effective opening permitted by shutter assembly 62 affords the farmer a choice between operating the unit to achieve a high percentage of cotton recovery with a correspondingly relatively high percentage of entrained trash or a somewhat lower percentage of cotton recovery with a correspondingly lower trash load in the recovered cotton. The term "cotton recovery" here is used in the sense of the amount of cotton collected from the combine as compared to the amount of cotton stripped at the front end of the machine. In those cases where the cotton crop is a relatively sparse one, the farmer may well be willing to accept a higher trash load in the collected cotton if by doing so he achieves a relatively high percentage of recovery. This result would be achieved by adjusting shutter 62 to provide a minimum opening from concave 30 to the grain collection system. If, on the other hand, the crop is an extremely lush one, the farmer may well be willing to accept a somewhat lower recovery percentage in return for an increased separation of trash, in which case, shutter 62 would be adjusted to provide a maximum opening at concave 30.

It should be borne in mind that conventional combines include suitable controls for varying the rotative speed of cylinder 28 and also for varying the radial spacing between the periphery of cylinder 28 and the facing surface of concave 30. Because these controls are conventional, details of the controls have not been disclosed; however, variations in the characteristics of the cotton crop being harvested will call for corresponding adjustments of cylinder speed and concave spacing.

The upper or left hand end of fixed plate 64 of shutter 62 as viewed in FIG. 2 is formed with a horizontally rearwardly projecting bridging lip 72 from which is suspended a fabric shroud which extends downwardly from bridge 72 to substantially close the otherwise open space between shutter 62 and the inlet end of straw walker 34, this open space otherwise communicating directly with the grain collection system. When used in a wheat harvesting operation, the characteristics of the straw are such that the straw is swept freely well across this space onto straw walker 34. In the cotton harvesting environment, however, the fibrous cotton is of relatively low density as compared to straw and the presence of bridge 72 and shroud 74 at the indicated location has been found desirable to prevent cotton fibers from floating downwardly past the position of shroud 74 into the grain collection system.

To assist in feeding the fibrous cotton from the outlet of cylinder 28 and concave 30 onto straw walker 34, a flail like kicker designated generally 76 is rotatably mounted near the outlet to apply the desired feeding action to cotton discharged from the cylinder and to also exert a flailing action on the material passing this region to further break up residual trash which is still intwined with the cotton fibers at this point.

In the cotton harvesting environment of the disclosed machine, the major portion of separation of trash from the cotton fibers occurs during the transit of the material along straw walker 34. Conventional straw walker operation relies for separation upon the mechanical agitating action imparted to the conveyed material combined with the flow of air from blower 36 which passes upwardly through the bed of material being conveyed on the straw walker through vent openings in the straw walker floor. In the case of a wheat harvesting operation, the straw is of much lower density and much larger area than the wheat grains and hence, by suitable adjustment of the blower output, wheat grains separated by mechanical agitation can drop through the vent openings into the grain collection, while the straw is floated by the upwardly directed air currents.

A similar action occurs in the case where the machine is employed to handle cotton, the cotton fibers being far less dense and much more susceptible to air currents than are the trash particles. The trash particles drop through the straw walker in the same manner as wheat grains and fall into the grain collection. Because of the relatively short length of the cotton fibers, a wire mesh grid 79 with approximately one-half inch openings is placed over the straw walker vents to minimize the amount of cotton fibers passing downwardly through the walker into the grain collection system. Trash particles falling into the grain collection system either through straw walker 34 or concave 30 are discharged from the combine by removing appropriate floor plates to provide discharge openings such as 78 (FIG. 2) from which the trash particles drop to the ground. Conveyors, such as 80 normally employed in the grain elevating system are preferably disconnected and inoperative when the machine is employed in a cotton harvesting operation.

Cotton fibers (with a small amount of residual trash) are fed rearwardly along straw walker 34 and eventually discharged from its left hand end as viewed in FIG. 2 to fall through what is the normal trash discharge opening of combine 20 at 42. To collect the cotton fibers dropping through opening 42, a hopper 82 of suitable construction determined by the location and configuration of opening 42 is mounted upon combine 22 receive the cotton fibers dropping through opening 42. A rotating kicker 84 is located in the bottom of the hopper to provide a feeding action which urges the cotton into an elevating conveyor designated generally 82 of conventional construction which elevates the fibers and discharges them into a trailing wagon 88 which is towed behind the combine.

It should be pointed out that the method and apparatus described above do not perform a complete or 100% separation of trash from the cotton fibers, and that cotton harvested in accordance with the present invention is still required to be processed by a cotton gin, this requirement being observed in any event in order that the cotton seeds which are persistently embedded in the fibers can be removed. The effectiveness of the present invention is perhaps most conveniently stated by noting as a typical example of comparison that 10,000 pounds of material harvested in accordance with the present invention will yield approximately 2500 pounds of lint at the gin while 10,000 pounds of material harvested by conventional methods from a comparable crop will yield only approximately 1800 pounds of lint at the gin. However, it should also be noted that the harvesting capacity of a typical combine employing the present invention will substantially exceed that of a conventional cotton harvester in that most cotton harvesters are limited to a two row capacity (row spacing is normally 48 inches) while the transverse width of the stripping heads of the present invention (14 to 22 feet) are such that the machine has a four to six row capacity and in addition is capable of harvesting broadcast cotton. Further, as is apparent from the foregoing description, the structural modifications necessary to convert a conventional combine to the practice of the present invention are neither numerous nor complex so that the combine can be readily converted from the harvesting of wheat or corn to cotton and vice versa while the conventional cotton harvester is but a single purpose machine useful only in harvesting cotton.

While one embodiment of our invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. The method of harvesting cotton by the use of a combine of conventional construction having a platform, a feeder house and separation means including a cylinder-concave thresher straw-walker-blower combination, said method comprising the steps of stripping cotton bolls from the stalks onto the platform and feeding the stripped bolls through the feeder house to the separating means, operating the separating means to pulverize the stem portions and other trash stripped with the boll into relatively small grain sized particles, feeding said grain sized particles into a first discharge system of the combine while feeding the cotton fibers into a second discharge system of the combine, and collecting the cotton fibers as they are discharged from the second discharge system of the combine.

2. The method of claim 1 further comprising the step of adjusting the effective inlet to the first discharge system from said cylinder-concave thresher to selectively establish the percentage of material passing into said inlet.

3. For use in combination with a combine having a serially arranged feeder house unit, cylinder-concave threshing unit and straw walker unit for feeding field crops successively through said units and separating granular particulate material from trash during passage of said crops through said threshing and straw walker units, each of the two last mentioned units having grid like means accommodating gravitational flow of separated granular material therethrough, first discharge means for receiving and discharging separated granular particulate material from said grid like means, and second discharge means for receiving and discharging trash and unseparated material from said straw walker; the improvement comprising stripping means mounted on the forward end of said combine for stripping cotton bolls from cotton plants and feeding the stripped bolls to said feeder house unit for feeding to said threshing unit and said straw walker unit, transfer means feeding cotton fibers from said threshing unit to said straw walker unit while simultaneously discharging pulverized trash through the grid like means of said threshing unit, a shutter member underlying a portion of the grid like means of said threshing unit partially restricting communication between the threshing unit and said first discharge means, which latter means discharges the trash onto the field, and collecting means receiving cotton fibers from said second discharge means.

4. Apparatus as defined in claim 3 wherein said shutter member is adjustable to selectively adjust the magnitude of the portion underlying said grid like means of said threshing unit.

5. Apparatus as defined in claim 3 wherein said shutter member underlies the portion of said grid like means adjacent the downstream end of said threshing unit.

6. Apparatus as defined in claim 3 wherein said transfer means includes a rotatable flail member mounted adjacent the downstream end of said threshing unit for feeding material from said threshing unit to said straw walker unit and for breaking up trash in said material.

7. Apparatus as defined in claim 3 wherein said collecting means comprises a hopper for receiving material from said discharge opening and elevating means for discharging material from said hopper.

* * * * *